United States Patent [19]

Smuckler

[11] Patent Number: 5,198,639
[45] Date of Patent: Mar. 30, 1993

[54] SELF-REGULATING HEATED MIRROR AND METHOD OF FORMING SAME

[76] Inventor: Jack H. Smuckler, 9 Countryside La., Marblehead, Mass. 01945

[21] Appl. No.: 610,795

[22] Filed: Nov. 8, 1990

[51] Int. Cl.⁵ .................... H05B 3/84; H05B 3/14
[52] U.S. Cl. .................... 219/219; 219/543; 219/504
[58] Field of Search ........... 219/219, 543, 522, 504, 219/505, 548, 549, 552, 553

[56] References Cited

U.S. PATENT DOCUMENTS

| | | | |
|---|---|---|---|
| 2,715,668 | 8/1955 | Booker et al. | 219/9 |
| 3,287,684 | 11/1966 | Armbruster, Jr. | 338/211 |
| 3,457,537 | 7/1969 | Hines | 338/162 |
| 3,793,716 | 2/1974 | Smith-Johannsen | 29/611 |
| 3,878,362 | 4/1975 | Stinger | 219/528 |
| 4,061,601 | 12/1977 | Clary | 219/219 |
| 4,071,736 | 1/1978 | Kamerling | 219/219 |
| 4,250,398 | 2/1981 | Ellis et al. | 219/345 |
| 4,485,297 | 11/1984 | Grise et al. | 219/528 |
| 4,575,620 | 3/1986 | Ishii | 219/505 |
| 4,591,700 | 5/1986 | Sopory | 219/505 |
| 4,658,121 | 4/1987 | Horsma | 219/553 |
| 4,761,541 | 8/1988 | Batliwalla et al. | 219/528 |
| 4,775,778 | 10/1988 | van Konynenburg | 219/553 |
| 4,777,351 | 10/1988 | Batliwalla et al. | 219/528 |
| 4,857,711 | 8/1989 | Watts | 219/219 |
| 4,882,466 | 11/1989 | Friel | 219/219 |

OTHER PUBLICATIONS

F. W. Billmeyer, "Textbook of Polymer Science," 3rd Ed., J. Wiley & Sons, New York, N.Y. (1984), pp. 3–4.
Morrison & Boyd, "Organic Chemistry", 3rd Ed., Allyn & Bacon, Inc., Boston, Mass. (1974) p. 206.
"McGraw Hill Dict. of Sci. & Tech. Terms," 4th Ed., S. P. Parker (Ed.) McGraw Hill Co., New York, N.Y. (1989), p. 1225.
Bueche, "A New Class of Switching Materials", *J. Appl. Phys.*, vol. 44, No. 1, Jan. 1973, pp. 532–533.

Primary Examiner—Teresa J. Walberg
Attorney, Agent, or Firm—Testa, Hurwitz & Thibeault

[57] ABSTRACT

A positive temperature coefficient composition including a monomeric crystalline organic material is disclosed having a preselected switching temperature below about 150° Fahrenheit. Devices incorporating same and related method of manufacture are set forth. The material includes a continuous, single phase solution of a polymer, for providing cohesion and flexibility to the positive temperature coefficient material.

8 Claims, 4 Drawing Sheets

SELF-REGULATING HEATED MIRROR AND METHOD OF FORMING SAME

The present invention relates to heated mirrors, and more particularly, to heated exterior mirrors for motor vehicles or the like.

It is desirable that a mirror, such as a motor vehicle side view mirror, be useful in all weather conditions. In cold weather, however, the mirror viewing surface may become obstructed with ice, frost, or fog, thus preventing its use. In some cases it is possible to heat the mirror viewing surface so as to eliminate any ice, frost or fog forming thereon.

In a known prior art heated mirror, an electrically conductive resistive coating is applied to a backing surface of a light reflective mirror element, as shown in U.S. Pat. No. 4,071,736. A thermostat is provided preferably set close to the back of the mirror. The thermostat senses the temperature of the heated mirror and switches the current flowing through the resistive heating conductors when the mirror is at a temperature below approximately 55° Fahrenheit. The thermostat is set such that no electrical current flows in the heating conductors above about 55° Fahrenheit, and preferably will prevent current flow at a temperature any higher than approximately 100° Fahrenheit.

Planar heating devices having resistive elements fabricated from conductive carbon or metal powders dispersed in a polymer matrix are well known in the art. U.S. Pat. No. 2,715,668 discloses an electrically conductive film panel heater having a resistive element fabricated from silver flake, antimony oxide, and graphite dispersed in an alkyd resin and xylene. U.S. Pat. No. 3,287,684 discloses an electrical heating device made from a conducting ink of a mixture of polyester resin, graphite and a solvent. U.S. Pat. No. 3,457,537 discloses a flexible resistance element film of a tetrafluoroethylene film coated with a formulation of a phenolic resin, conductive carbon black and acetone. U.S. Pat. No. 3,878,362 discloses an electric heater having a laminated structure. The resistive element has an insulating polymeric film coated with an electrically conductive elastomeric material containing conductive carbon black dispersed in a heat-resistant elastomer.

U.S. Pat. No. 4,071,736 discloses a defrosting mirror having a resistive coating with graphite particles dispersed in a solvated fluoro-elastomer polymer, which is painted onto a primed glass surface. U.S. Pat. No. 4,250,398 discloses a solid state electrically conductive laminate (an electrically conductive layer of graphite in an acrylic polymer matrix) which functions as a resistive heater. U.S. Pat. No. 4,485,297 discloses an electrical resistance heater of a plastic film substrate on which is printed a resistive pattern using a conventional silk-screen process and commercially available conductive silk-screen inks. The foregoing heaters are low cost but constant wattage devices, without overheat protection.

Non-planar heating devices which have temperature control, so-called temperature self-regulating heating devices, are well known in the art. Such heating devices may include two discrete, spaced apart elongated conductor wires joined in physical and electrical contact by an extruded, cross-linked, solid polymer of carbon black particles dispersed in a crystalline polymer matrix. This heating device can temperature self-regulate in the range of the crystalline melt temperature of the polymer and typically at temperatures of about 200° Fahrenheit. These heating devices are essentially heating cables, and are neither low-cost nor planar heating devices.

Planar temperature self-regulating heating devices are disclosed in U.S. Pat. Nos. 4,761,541, and 4,777,351. The resistive element is an extruded and irradiation cross-linked thin sheet having carbon black dispersed in a polyvinylidene fluoride polymer. Electrodes are screen printed on one surface of the sheet using commercial conductive ink of silver particles dispersed in an elastomer. This method requires melt-extrusion and irradiation cross-linking, both of which are relatively expensive procedures.

In an entirely different area of industrial endeavor, it is known to make polymers electrically conductive by dispersing therein suitable amounts of carbon black or another finely divided conductive filler. Various of these conductive polymers exhibit what is known as positive temperature coefficient behavior. Electrical devices including conductive polymer elements are well known, including in particular sheet heaters. These heaters include a laminar resistive heating element having a conductive polymer, i.e., a mixture of conductive filler and an organic polymer, the filler being dispersed in or otherwise held by the organic polymer. The filled polymer may exhibit positive temperature coefficient behavior, thus rendering the heater self-regulating.

It has been known, at least since 1972, that by combining several volume percent of conducting particles in a semicrystalline matrix, a highly temperature-dependent resistivity can be obtained. The resistivity changes by several orders of magnitude in a small temperature interval centered on the crystal melting point structure. Hence, as reported by Bueche, in JAP Vol. 44, No. 1, January 1973, pp. 532-533, when a particulate electrical conducting filler is added to a nonconducting matrix, the system undergoes a sharp transition from nonconductor to conductor at a critical volume percent of filler, typically about 7 percent. This effect can be used to produce materials with switching capabilities. For example, room-temperature electrical resistivity of carbon black dispersed in a hydrocarbon wax (such as $C_{36}H_{74}$) will experience a precipitous resistivity drop at about six volume percent carbon black. Since the wax melts at 73° Fahrenheit, with a consequent increase of volume of about 22 percent, the volume fraction of black will suddenly decrease as the temperature is raised above 73° Fahrenheit. This sudden change in volume at the melting point will cause a sharp change in resistivity at that melt temperature.

Hence, the addition of a monomeric crystalline organic chemical to a conductive ink can impart temperature self-regulating properties to coatings fabricated from that ink. A heating element made from such ink, if the ink includes a sufficient amount of monomeric crystalline organic chemical, will temperature self-regulate in the range of the characteristic crystalline melt temperature of that monomer. Thus by careful selection of the monomeric crystalline organic chemical according to its specific crystalline melt temperature, a heating element can be fabricated which temperature self-regulates in a predetermined, desired temperature range, i.e., at the crystalline melt temperature of the added monomer.

It is therefore an object of the present invention to provide a low cost temperature self-regulating heating element using resistive inks printed onto an insulating polymer film, the film being affixable to a temperature-sensitive device for control of the temperature of that device.

It is another object of the present invention to provide a mirror having self-heating and self-regulating capability which is operative without a separate thermostatic element.

It is a further object of the present invention to provide an inexpensive heated and self-regulating motor vehicle mirror.

It is a further object of the present invention to provide a motor vehicle mirror which can heat and self-regulate at a temperature below about 150° Fahrenheit.

SUMMARY OF THE INVENTION

A new positive temperature coefficient composition is disclosed which alleviates the weather-sensitive nature of various devices, such as motor vehicle mirrors, for example. The composition is formed of a monomeric crystalline organic material having a characteristic melt temperature below about 150° Fahrenheit.

In one embodiment of the invention, a positive temperature coefficient composition having a preselected switching temperature below about 150° Fahrenheit includes a continuous, single phase solution of a polymer, the polymer providing cohesion and flexibility to the resulting material, the polymer having greater than twenty five percent by weight of the single phase solution, and the material also including a monomeric crystallizable organic compound miscible in the polymer, the compound having 10–40 carbon atoms and a characteristic crystalline melt temperature, the compound being selected from the group consisting of saturated hydrocarbons, organic acids and alcohols, and an electrically conductive particulate material dispersed throughout the single phase solution, with the composition having a switching temperature in the vicinity of the characteristic crystalline melt temperature. The composition may include a polymer comprising fifty percent by weight of single phase solution. The polymer is preferably solvated or solvatable. The composition may be a crystalline or non-crystalline and cross-linkable polymer. The switching temperature preferably occurs within 15° Fahrenheit of the organic compound crystalline melt temperature.

An electrical planar heater may be formed from the above new positive temperature coefficient material, such as on a mirror for use in a motor vehicle. For example, a heated motor vehicle mirror assembly in accordance with the present invention includes a reflective mirror element, the element having a first side and a second side, the second side having a reflective coating applied thereto to facilitate viewing, from the first side, of an image reflected from the reflective coating, the second side also having an electrical heating element coupled intimately therewith, the heating element including a temperature self-regulating positive temperature coefficient material, the material having a polymer matrix containing dispersed electrically conductive particulate material, the matrix including a polymer-miscible monomeric crystallizable organic compound having a selected characteristic crystalline melt temperature below about 150° Fahrenheit, the compound being selected from the group including saturated hydrocarbons, organic acids and alcohols, the compound being added to the polymer matrix in an amount sufficient to set the switching temperature of the resulting composition to a temperature range in the vicinity of the selected characteristic crystalline melt temperature such that the heating element temperature self-regulates in the range of the selected characteristic crystalline melt temperature.

The electrical heating element may include a laminar insulating sheet coupled to the mirror second side wherein the positive temperature coefficient material is coated and dried onto the insulating sheet to form a laminar resistive heating element. The assembly may further include two or more spaced apart electrodes attached to the heating element such that when current passes through the electrodes the heating element switches at a temperature near the characteristic crystalline melt temperature of the monomeric crystalline organic material. The dispersed electrically conductive particulate material is preferably a carbon black.

Preferably the positive temperature coefficient material includes a polymer which is solvated or solvatable. It is also preferred that the switching temperature occurs within 15° Fahrenheit of the organic compound crystalline melt temperature.

One method of the invention for manufacturing a new positive temperature coefficient material having a preselected switching temperature below about 150° Fahrenheit includes the step of introducing into a polymer matrix containing dispersed electrically conductive particulate material, a polymer-miscible monomeric crystallizable organic compound having 10–40 carbon atoms and a characteristic crystalline melt temperature, wherein the compound is selected from the group consisting of saturated hydrocarbons, organic acids and alcohols in an amount sufficient to set the switching temperature of the resulting material to a temperature range in the vicinity of the characteristic crystalline melt temperature.

These and other objects, benefits, advantages and embodiments of the present invention will be disclosed and more fully understood by reference to the following detailed description in conjunction with the attached drawings.

DETAILED DESCRIPTION OF THE PREFERRED EMBODIMENT

Figure 1:
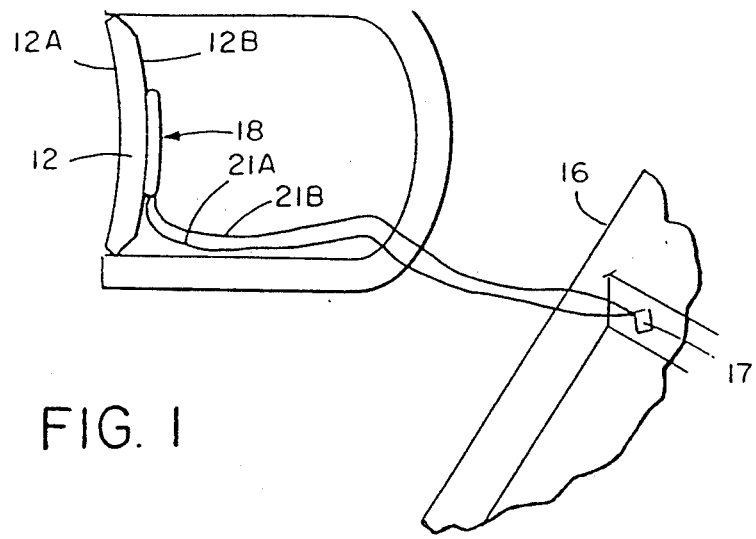
FIG. 1 is a side cross-section of a side view mirror for a motor vehicle in practice of the present invention.

In a preferred embodiment of the invention, as illustrated in FIG. 1, a heated motor vehicle mirror 10 is shown in side view, in which a reflective mirror element 12 is held by a mirror housing 14. The mirror housing is typically coupled to a motor vehicle body 16, as shown. The mirror element has an exposed viewing surface 12A and a backing surface 12B. Applied to backing surface 12A is an electrical planar heating element 18.

Figure 2A:
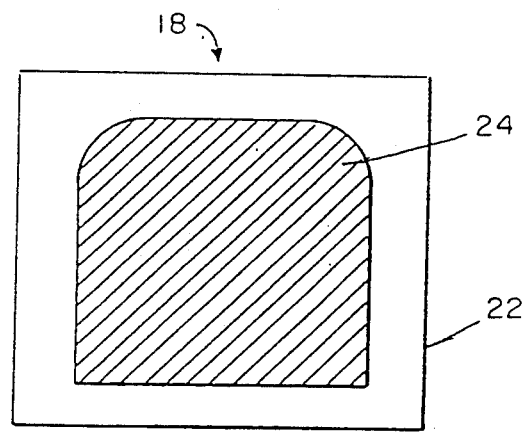
FIG. 2A is a top view of a heating element in practice of the present invention.
Figure 2B:
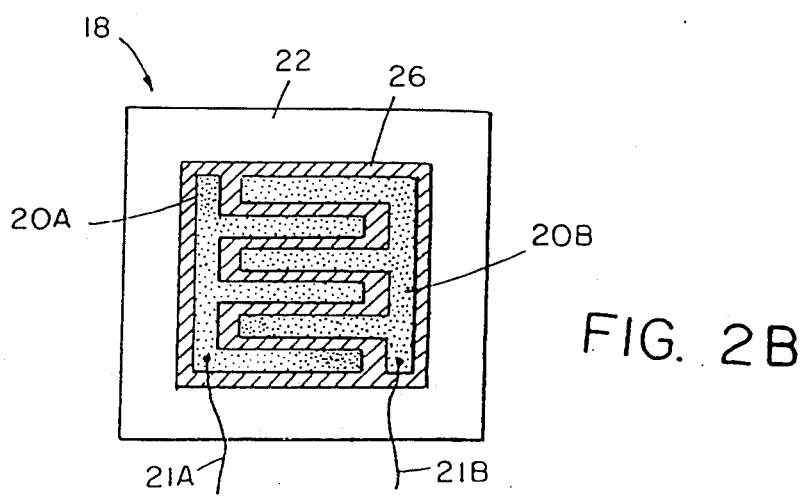
FIG. 2B shows the heating element with electrodes formed thereon.

Heating element 18 is more particularly shown in FIG. 2A. The heating element includes a laminar insulating sheet 22 having coated thereon a resistive composition coating 24. The resistive composition coating preferably includes conductive particles (such as conductive carbon black) dispersed in a solvated polymeric material containing a monomeric, crystalline organic chemical with a characteristic crystalline melt temperature. The resistive composition is typically applied wet to the insulting sheet 22. The resistive composition 24 dries to form a positive temperature coefficient resistive element 26, as shown in FIG. 2B with two spaced apart electrodes 20A, 20B formed on the dry resistive element in a manner such that a current flowing through the electrodes passes through a substantial portion of the resistive element. The electrodes are typically formed of a silver coating on the resistive element in a "finger" pattern, as shown. Take-off leads 21A, 21B couple electrodes 20A, 20B to a source 17 of electrical current within the motor vehicle to supply current to the device.

The resulting planar heating element 18 has been demonstrated to have the property that when current passes through the electrodes 20, resistive element 26 switches from a high to low conductivity state at a temperature near the characteristic crystalline melt temperature of the monomeric crystalline organic chemical. Therefore, by selection of a particular combination of polymer and organic chemical, it is now possible to select the switching temperature of resistive element 26, and thereby to control the temperature at which the element self-regulates. In operation, a cooled heating element 18 of a given conductivity will heat to around its switching temperature and then will change rather precipitously to a low conductivity state; the element will then cool to below the switching temperature and will toggle back to high conductivity until it again reaches the switching temperature. The element continuously cycles in this manner.

In practice of the present invention, laminar insulating sheet 22, with resistive element 26 and conductors 20 formed thereon, is mounted or formed on backing surface 12b of mirror 12. The heater is so formed of a selected composition of resistive material so as to automatically and self-regulatedly operate at a temperature which effectively will maintain the viewing surface 12a of mirror element 12 ice, frost, and fog-free, and preferably at a temperature low enough so as not to pose a hazard to a person who might touch the heated mirror or mirror housing.

The actual automatic self-heating and self-regulating threshold of the heating element will be selected according to the mass of the heating element and the mass of mirror 12, i.e., how many BTUs are required for a given application. Hence it is desirable to provide a heating element which can self-regulate at or below about 150° Fahrenheit so as to provide a motor vehicle mirror which can be maintained at a temperature of perhaps about 40° Fahrenheit, which is both above freezing and below a temperature posing danger to human touch.

A preferred method for manufacturing positive temperature coefficient material having a preselected switching temperature below about 150° Fahrenheit includes the steps of: introducing into a polymer matrix (which contains dispersed electrically conductive particulate material such as conductive carbon black) a polymer-miscible monomeric crystallizable organic compound having 10-40 carbon atoms and a characteristic crystalline melt temperature. The compound is preferably selected from the group of saturated hydrocarbons, organic acids and alcohols. The organic compound is preferably added to the polymer matrix in an amount sufficient to set the switching temperature of the resulting positive temperature coefficient material to a temperature range in the vicinity of the characteristic crystalline melt temperature of the polymer-miscible monomeric crystalline organic compound.

Preferably, the polymer is solvated or solvatable. The polymer may be crystalline or non-crystalline polymer, and may also be cross-linkable. Crystalline polymers should have a melt temperature at least 10° Fahrenheit above that of the crystallizable monomeric organic compound. It is also possible to incorporate a chemical cross-linking agent into the resistive composition, and to heat cure the resultant coating for the following benefits; (1) if not crosslinked the heater might be destroyed if exposed to a very high temperature, and (2) crosslinking prevents a drop-in resistance above the switching temperature (see examples 2 and 3). Furthermore, preferably the switching temperature of the positive temperature coefficient polymer material is within 15° Fahrenheit of the characteristic crystalline melt temperature of the monomeric organic compound.

In a particular embodiment of the present invention, a positive temperature coefficient composition having a preselected switching temperature below about 150° Fahrenheit includes a material having a continuous, single phase solution of a polymer for providing cohesion and flexibility to the positive temperature coefficient material and having greater than 25% by weight of the single phase solution, a monomeric crystallizable organic compound miscible in the polymer and having 10-40 carbon atoms and a characteristic crystalline melt temperature, the compound being selected from the group of saturated hydrocarbons, organic acids, and alcohols, and electrically conductive particulate material being dispersed throughout the single phase solution.

The resulting composition will have a switching temperature in the vicinity of the characteristic crystalline melt temperature. Preferably, the polymer comprises 50 percent by weight of the single phase solution.

It will now be appreciated that the present invention recognizes that the addition of monomeric crystalline organic chemicals with characteristic crystalline melt temperatures to a composition having conductive particles dispersed in a solvated polymer system can produce a formulation which can be coated onto an insulating substrate and dried to produce a resistive member that can function as a planar positive temperature coefficient heating element which temperature self-regulates in the range of the characteristic crystalline melt temperature of the monomeric crystalline organic chemical. Furthermore, when such heating element is located on the backing surface, of a temperature-sensitive device, the temperature of the device may be maintained at a preselected level according to the selected characteristics of the heater made in practice of the present invention.

The present invention can utilize a broad range of monomeric crystalline organic chemicals. One category is straight chain hydrocarbons because they are available in a broad selection of melting points are available at high purity and each melts over a narrow temperature range. The following tables list examples of straight chain hydrocarbons (Table A), organic acids (Table B) and organic alcohols (Table C), for use in practice of the present invention.

TABLE A

| | Melt Temp. °C. | | Melt Temp. °C. |
|---|---|---|---|
| n-octane | −57 | n-nonadecane | 32 |

TABLE A-continued

| | | | |
|---|---|---|---|
| n-nonane | −54 | n-eicosane | 36 |
| n-decane | −30 | n-heneicosane | 40 |
| n-undecane | −26 | n-docosane | 44 |
| n-dodecane | −10 | n-tricosane | 47 |
| n-tridecane | −5.4 | n-tetracosane | 51 |
| n-tetradecane | 5.9 | n-pentacosane | 53 |
| n-pentadecane | 10 | n-hexacosane | 56 |
| n-hexadecane | 18 | n-octacosane | 61 |
| n-heptadecane | 22 | n-tricontane | 65 |
| n-octadecane | 28 | n-dotricontane | 70 |

| | Melt Temp. °C. |
|---|---|
| n-tetratricontane | 72 |
| n-hexatricontane | 76 |
| n-octatricontane | 77 |
| n-tetracontane | 81 |
| n-tetratricontane | 86 |

TABLE B

| | Melt Temp. °C. |
|---|---|
| Formic acid | 8 |
| Acetic acid | 17 |
| Propionic acid | −22 |
| Butyric acid | −6 |
| Valeric acid | −34 |
| Caproic acid | −3 |
| Caprylic acid | 16 |
| Capric acid | 31 |
| Lauric acid | 44 |
| Myristic acid | 54 |
| Palmitic acid | 63 |
| Stearic acid | 70 |
| Oleic acid | 16 |
| Linoleic acid | −5 |
| Linolenic acid | −11 |

TABLE C

| | Melt Temp. °C. |
|---|---|
| 1-octanol | −17 |
| 1-decanol | 7 |
| 1-undecanol | 19 |
| Lauryl alcohol | 26 |
| 1-tridecanol | 32 |
| Myristyl alcohol | 39 |
| 1-pentadecanol | 35 |
| Cetyl alcohol | 50 |
| 1-heptadecanol | 54 |
| Stearyl alcohol | 59 |
| 1-nonadecanol | 62 |
| Oleyl alcohol | 6 |

The addition of as little as 5 percent by weight of dry solids of a crystalline organic chemical to a resistive coating formulation can cause a measurable increase in resistance with increased temperature. The addition of higher percentages of crystalline organic chemicals result in greater increases in resistance with increased temperature.

Many different kinds of conductive particles can be utilized in practice of the present invention including metal powders such as silver, gold, nickel, and the like. Also, powdered graphite can be used. However, a preferred conductive material is carbon black and most preferably the so-called conductive carbon black. Carbon blacks tend to be found, not as individual particles, but rather as chain-like structures. High structure carbon blacks, i.e., those with long chains of particles, are considered conductive carbon blacks because they impart greater electrical conductivity to polymer systems than do low structure carbon blacks.

Various polymers can be used in practice of the invention, such as alkyds, polyesters, phenolics, polyisobutylene, tetrafluoro ethylene fluoro elastomers, polyethylene, polypropylene, ethylene co-polymers such as ethylene vinyl acetate, or ethylene ethyl acrylate, and fluoropolymers.

Solvated polymeric materials are preferred for use in this invention. Such materials are widely available from a number of sources, and include epoxy esters, amino resins, urethanes, unmodified alkyds, modified, alkyds, polyesters, silicone resins, polyurethane resins, urea-formaldehyde resins, melamide-formaldehyde resins, and epoxy resins.

To obtain satisfactory and reproducible results it is most important that the conductive powder be well dispersed into the formulation. This is particularly true when the conductive powder is conductive carbon black. Carbon black has been used in the industry in many various applications, such as in inks, coatings, etc. In this area it is known that many important properties of the final product, including conductivity, are determined by the degree of dispersion of the incorporated carbon black. The various pieces of equipment used to disperse carbon black into formulations, include ball mills, attritors, high speed impeller mixers, three-roll mills, and mills, heavy duty mixers, two-roll mills, etc. Alternatively carbon black predispersed in water, organic solvent or in a polymer system can be used. These predispersed products can then be added to other ingredients in a formulation using low cost, low shear mixing equipment.

EXAMPLES

Figure 3:
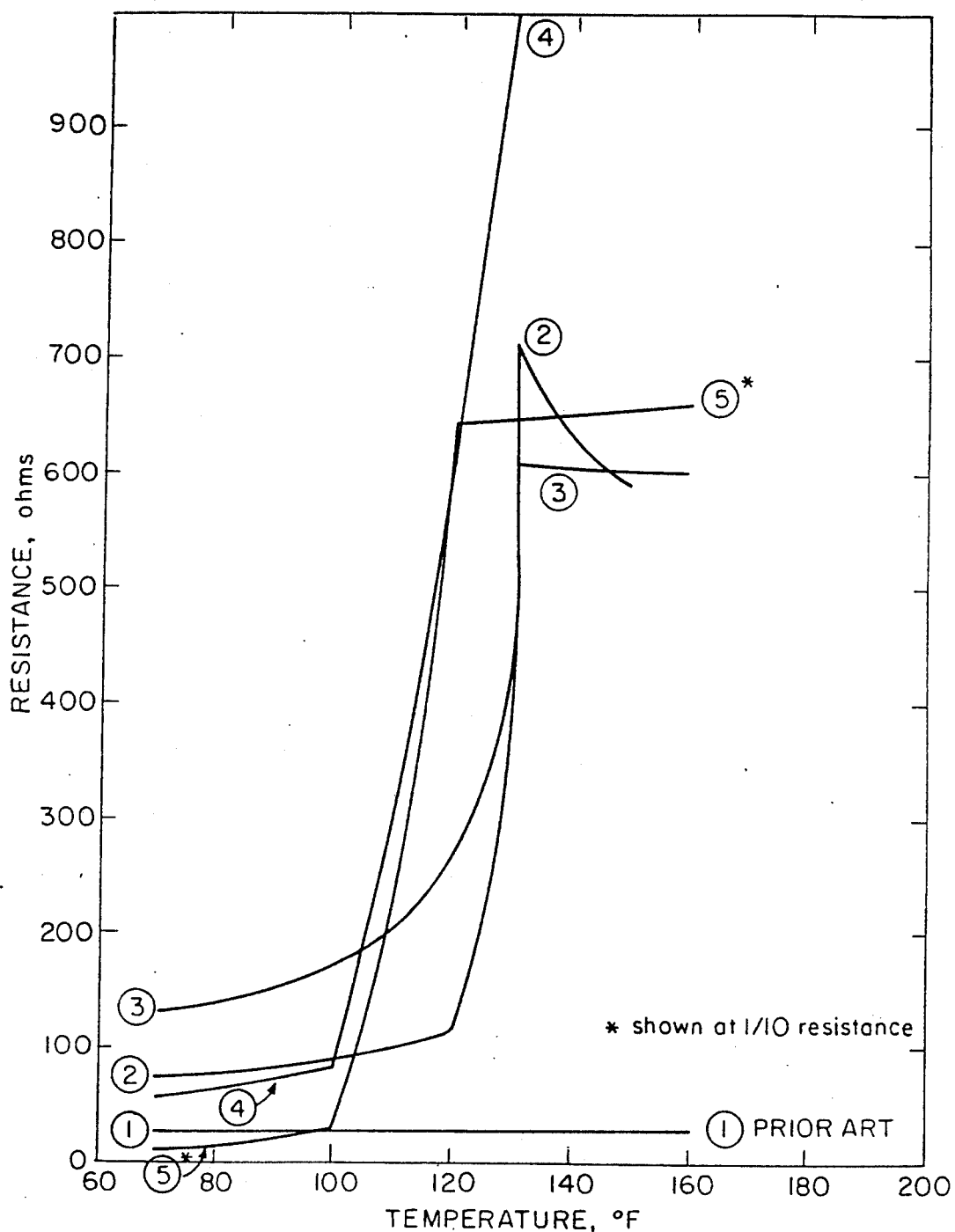
FIGS. 3–5 are graphs of resistance versus temperature for compounds exhibiting positive temperature coefficient characteristics.
Figure 4:
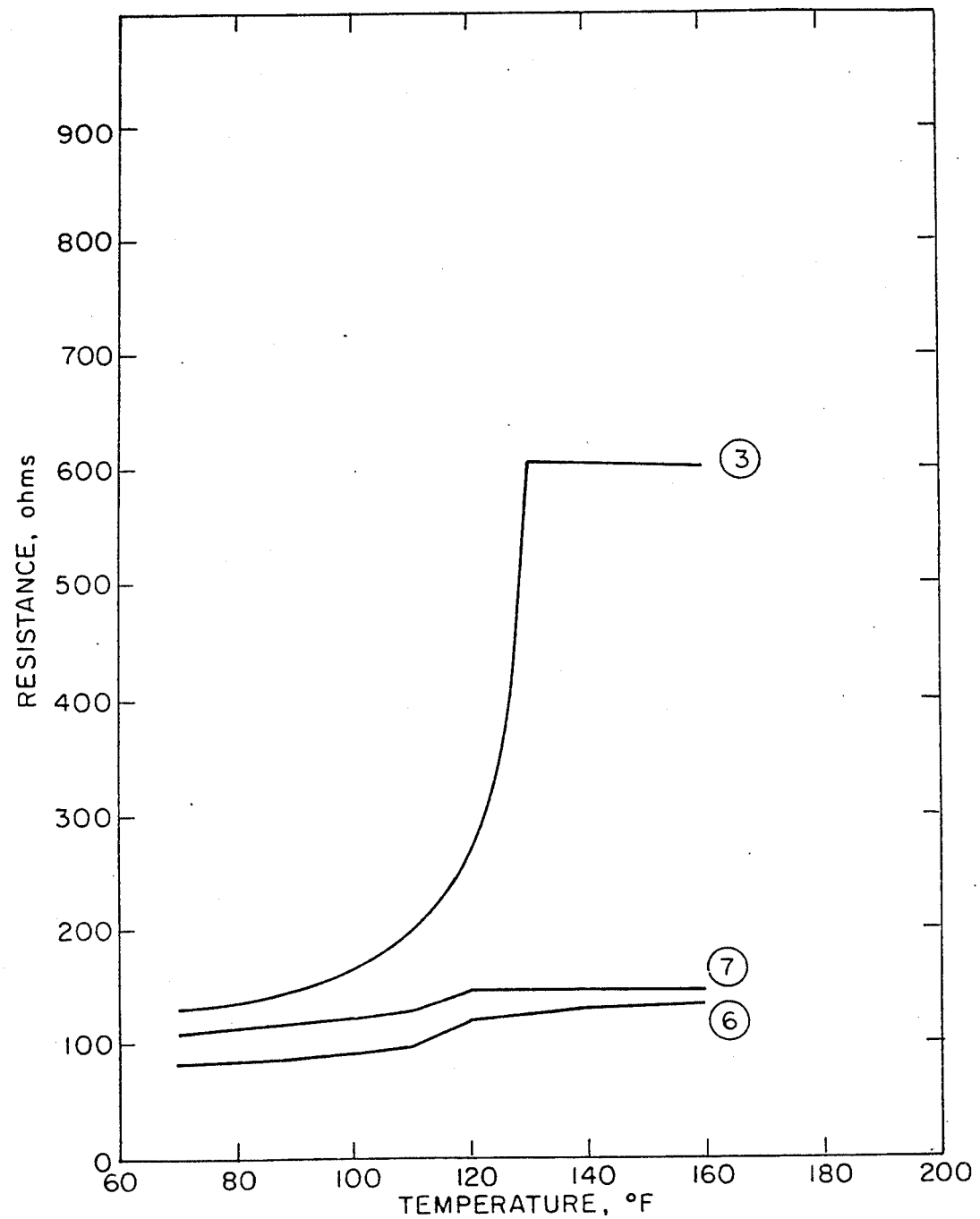
Figure 5:
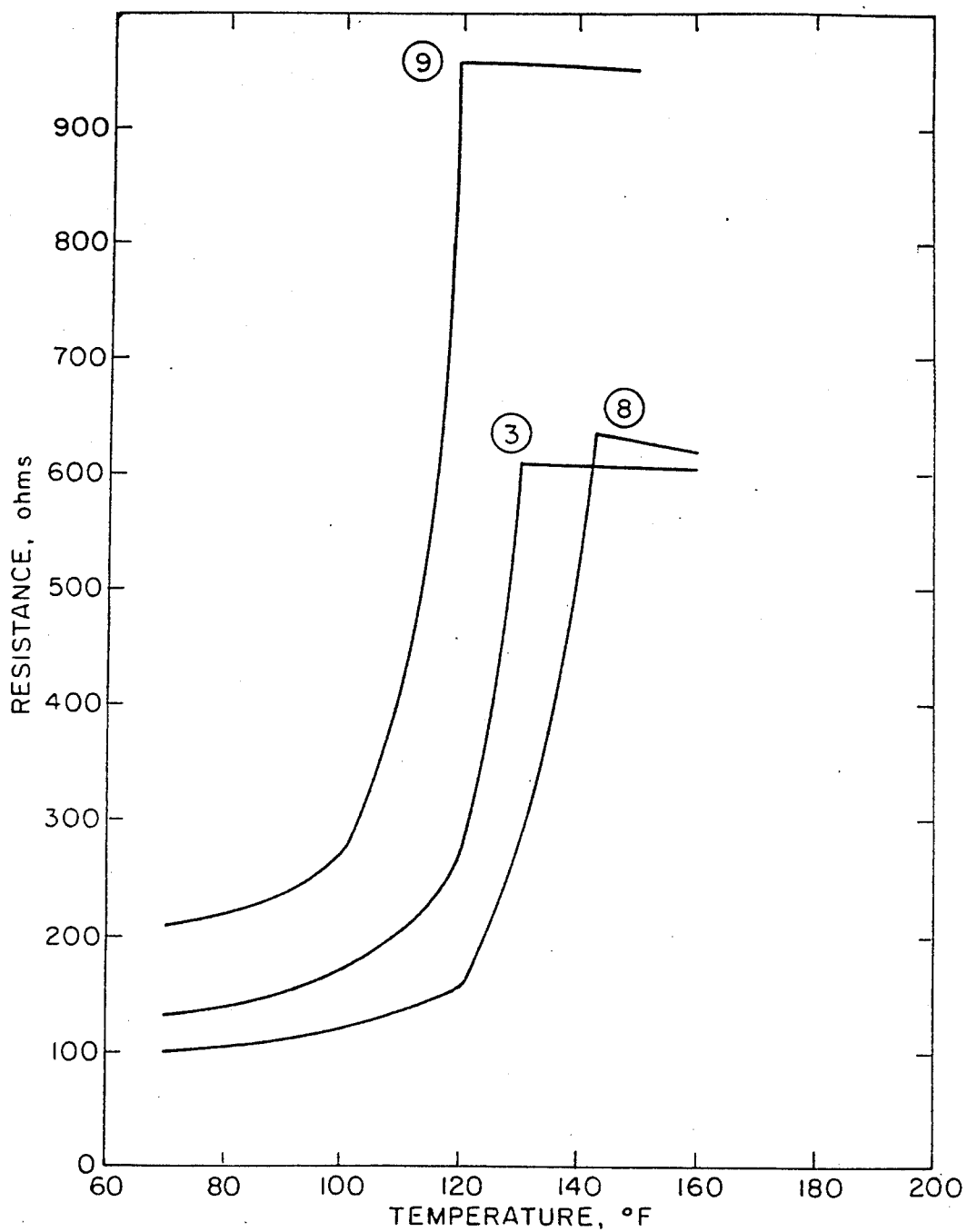

The following examples are set forth by way of illustration and not by way of limitation, and will be appreciated by reference to FIGS. 3–5 and Tables D and E.

EXAMPLE I

Formulation 1 of Table D is an example of a prior art conductive formulation used to produce a resistive coating for a planar heating device. Quantities are in grams. The formulation was prepared by dissolving the polyester resin into toluene and adding it and the aromatic isocyanate resin to the conductive carbon black dispersion with mechanical stirring. A resistive coating for use in laboratory testing was prepared as follows. A 3 inch by 6 inch sheet of polyester film was taped to a glass plate. Two 4 inch long strips of 8 mil thick pressure-sensitive tape were pressed onto the surface of the polyester film in parallel, ½ inch apart. A small quantity of Formulation 1 was placed at one end of the ½ space between the tapes and drawn down slowly using a razor blade.

The ink was air dried for 1 hour and then heated for 30 minutes at 180 degrees Fahrenheit in a laboratory oven. After slow cooling to room temperature, 2 silver electrode strips, ¼ inch apart were painted onto the ½ inch wide resistive coating using commercial conductive silver ink. The electrodes were air dried for 1 hour and heated to 180 degrees Fahrenheit in a laboratory oven and slowly cooled to room temperature. Alligator clips were attached to the 2 silver electrodes and connected to a Fluke 8050 A digital multimeter programmed to measure DC resistance. The polyester film with alligator clips attached, still taped to a glass plate was placed in a laboratory oven at 70 degrees Fahrenheit. The oven was heated slowly while resistance readings were recorded every 10 degrees Fahrenheit. At 70 degrees Fahrenheit the coating had a resistance of 27.6 ohms and increased at the rate of 0.2 ohms per 10 degrees Fahrenheit reaching a resistance of 29.4 ohms at 160 degrees Fahrenheit. These results are listed in Table E and are illustrated as curve 1 in FIG. 3. While this planar heating device shows a positive temperature coefficient of resistance, the rise in resistance with temperature is not sufficient to make the heating device temperature self-regulating.

EXAMPLE 2

Formulation 2 in Table D is an example of the present invention. Myristic acid has a crystalline melt temperature of 129 degrees Fahrenheit (54 degrees centigrade). This formulation was prepared by warming the conductive carbon black dispersion to 160 degrees Fahrenheit, and adding the polyester resin solution and the myristic acid using mechanical stirring. A resistive coating was prepared and silver electrodes applied using the procedure described in Example 1. The effect of temperature on the resistance of the coating was determined using the procedure described in Example 1. Test results are listed in Table E and are illustrated as curve 2 in FIG. 3.

This planar heating device shows a sharp rise in resistance between 120 and 130 degrees Fahrenheit making it a temperature self-regulating heating device. The so-called switching temperature is in the range of the crystalline melt temperature of 129 degrees Fahrenheit of myristic acid.

The drop in resistance above 130 degrees Fahrenheit, where curve 2 shows a negative temperature coefficient of resistance, but can be overcome by crosslinking of the polymer matrix.

EXAMPLE 3

Formulation 3 is a preferred example of the present invention. This formulation was prepared by warming the conductive carbon black dispersion to 160 degrees Fahrenheit and adding the polyester resin and myristic acid using mechanical stirring. The mix was allowed to cool to room temperature and the remaining ingredients were added using mechanical stirring. A resistive coating was prepared and silver electrodes applied using the procedure described in Example 1. The effect of temperature on the resistance of the coating was determined using the procedure described in Example 1. Test results are listed in Table E and are illustrated as curve 3 in FIG. 3.

This planar heating device containing a crosslinked polyester resin system has a sharp rise in resistance with increased temperature and does not have a sharp drop in resistance above its maximum resistance reading.

EXAMPLE 4

Formulation 4 is a preferred example of the present invention. This formulation was prepared using the procedure described in Example 2. A resistive coating was prepared and tested using the procedure described in Example 1. Test results are listed in Table E and illustrated as curve 4 in FIG. 3.

EXAMPLE 5

Formulation 5 is also a preferred example of the present invention. This formulation was prepared using the procedure described in Example 2. A resistive coating was prepared and tested using the procedure described in Example 1. Test results are listed in Table E and are illustrated as curve 5 in FIG. 3.

EXAMPLE 6 and 7

Formulations 6 and 7 are also examples of the present invention. They were prepared using the procedure described in Example 3 and coatings were prepared and tested using the procedure described in Example 1. Test results are listed in Table E and are illustrated as curves 6 and 7 in FIG. 4. For comparative purposes curves 1 and 3 from FIG. 3 are shown as well.

Formulation 1 containing no crystalline organic chemical exhibited almost no increase in resistance with an increase in temperature and would produce a heating device with no temperature self-regulating effect. Formulations 6 and 7 containing 10 and 5 percent respectively of myristic acid showed that a rather modest increase in resistance with an increase in temperature could produce a heating device which in some instances would provide sufficient resistance change to produce a temperature self-regulating effect. Formulation 3 containing 25 percent myristic acid exhibited a sharp rise in resistance with an increase in temperature and would produce a heating device with an excellent temperature self-regulating effect.

EXAMPLES 8 and 9

Formulations 8 and 9 are also examples of the present invention. They were prepared using the procedure described in Example 3 and coatings were prepared and tested using the procedure described in illustrated as curves 8 and 9 in FIG. 5. For comparative purposes curve 3 from FIG. 3 is shown as well.

The three curves shown in FIG. 5 not only illustrate the sharp rise in resistance obtained with these formulations but also show that by the selection of crystalline organic chemical with selected crystalline melt temperatures coatings which have a sharp rise in resistance at a specific temperature can be formulated. Formulation 9 containing lauric acid, which has a crystalline melt temperature of 111 degrees Fahrenheit (44 degrees centigrade), exhibited a sharp rise in resistance in the 111 degrees Fahrenheit range. Formulation 3 containing myristic acid, which has a crystalline melt temperature of 129 degrees Fahrenheit (54 degrees centigrade), exhibited a sharp rise in resistance in the 129 degrees Fahrenheit range. Formulation 8 containing palmitic acid, which has a crystalline melt temperature of 145 degrees Fahrenheit (63 degrees centigrade), exhibited a sharp rise in resistance in the 145 degrees Fahrenheit range.

TABLE D

| | WEIGHT IN GRAMS | | | | | | | | | |
|---|---|---|---|---|---|---|---|---|---|---|
| | Formulation # | | | | | | | | | |
| | 1 | | 2 | | 3 | | 4 | | 5 | |
| | Wet | Dry | Wet | Dry | Wet | Dry | Wet | Dry | Wet | Dry |
| a) Conductive Carbon Black | 25 | 5 | 25 | 5 | 25 | 5 | 25 | 5 | 25 | 5 |

TABLE D-continued

WEIGHT IN GRAMS

| | | | | | | | | | | |
|---|---|---|---|---|---|---|---|---|---|---|
| b) Polyester Resin 20% Dispersion | 22 | 8.8 | 25 | 10 | — | — | — | — | — | — |
| c) Polyester Resin 40% Solution | — | — | — | 12.9 | 9 | — | — | — | — | — |
| | | | | | | | | | | |
| c) Polyester Resin 70% Solution | — | — | — | 12.9 | 9 | — | — | — | — | — |
| d) Epoxy Ester Resin 70% Solution | — | — | — | — | — | — | 24.3 | 10 | — | — |
| e) Modified Acrylic Resin 50% Solution | — | — | — | — | — | — | — | — | 20 | 10 |
| f) Isocyanate Resin 75% Solution | 1.6 | 1.2 | — | — | — | — | — | — | — | — |
| g) Hexamethoxy Methyl Melamine 100% | — | — | — | 1 | 1 | — | — | — | — | — |
| h) P-Toluene Sulfonic Acid 10% Solution | — | — | — | 1 | 0.1 | — | — | — | — | — |
| i) Myristic Acid | — | — | 5 | 5 | 5 | 5 | — | — | — | — |
| j) n-Tetracosane | — | — | — | — | — | — | 5 | 5 | — | — |
| k) Cetyl Alcohol | — | — | — | — | — | — | — | — | 5 | 5 |
| l) Palmitic Acid | — | — | — | — | — | — | — | — | — | — |
| m) Lauric Acid | — | — | — | — | — | — | — | — | — | — |

| | Formulation # | | | | | | | |
|---|---|---|---|---|---|---|---|---|
| | 6 | | 7 | | 8 | | 9 | |
| | Wet | Dry | Wet | Dry | Wet | Dry | Wet | Dry |
| a) Conductive Carbon Black 20% Dispersion | 25 | 5 | 25 | 5 | 25 | 5 | 25 | 5 |
| b) Polyester Resin 40% Solution | — | — | — | — | — | — | — | — |
| c) Polyester Resin 70% Solution | 16.7 | 11.7 | 18 | 12.6 | 12.9 | 9 | 12.9 | 9 |
| d) Epoxy Ester Resin 70% Solution | — | — | — | — | — | — | — | — |
| e) Modified Acrylic Resin 50% Solution | — | — | — | — | — | — | — | — |
| f) Isocyanate Resin 75% Solution | — | — | — | — | — | — | — | — |
| g) Hexamethoxy Methyl Melamine 100% | 1.3 | 1.3 | 1.4 | 1.4 | 1 | 1 | 1 | 1 |
| h) P-Toluene Sulfonic Acid 10% Solution | 1 | 0.1 | 1 | 0.1 | 1 | 0.1 | 1 | 0.1 |
| i) Myristic Acid | 2 | 2 | 1 | 1 | — | — | — | — |
| j) n-Tetracosane | — | — | — | — | — | — | — | — |
| k) Cetyl Alcohol | — | — | — | — | — | — | — | — |
| l) Palmitic Acid | — | — | — | — | 5 | 5 | — | — |
| m) Lauric Acid | — | — | — | — | — | — | 5 | 5 |

TABLE E

RESISTANCE IN OHMS

| Temperature °F. | Formulation # | | | | | | | | |
|---|---|---|---|---|---|---|---|---|---|
| | 1 | 2 | 3 | 4 | 5 | 6 | 7 | 8 | 9 |
| 70 | 27.6 | 74 | 131 | 58.6 | 129 | 82.1 | 108 | 99.9 | 212 |
| 80 | 27.8 | 78 | 139 | 62.7 | 141 | 83.1 | 111 | 104 | 221 |
| 90 | 28.0 | 82 | 153 | 66.8 | 184 | 86.0 | 115 | 111 | 241 |
| 100 | 28.2 | 89 | 167 | 71.9 | 333 | 91.6 | 123 | 121 | 277 |
| 110 | 28.4 | 99 | 190 | 112 | 2520 | 103 | 134 | 134 | 416 |
| 120 | 28.6 | 118 | 272 | 622 | 6410 | 121 | 145 | 157 | 956 |
| 130 | 28.8 | 714 | 607 | 993 | 6500 | 131 | 145 | 201 | 977 |
| 140 | 29.0 | 630 | 603 | 1120 | 6590 | 133 | 143 | 529 | 966 |
| 150 | 29.2 | 587 | 601 | 1170 | 6630 | 134 | 144 | 632 | 941 |
| 160 | 29.4 | — | 600 | 1210 | 6590 | 134 | 144 | 620 | 920 |

TABLE D NOTES (a) The 20% conductive carbon black dispersion in aromatic solvent is available as Codispersion 30-R-20 produced by Borden Chemical Company, Adhesives and Graphics Division.

(b) The polyester resin is Pentaflex 49001, a 100% solids, soft, tacky polyester resin produced by Whittaker Corporation, Dayton Division. The resin was dissolved into toluene, warmed to 160° F. with mechanical agitation until homogeneous.

(c) The 70% solution of polyester resin in Solvesso 150 is Cyplex 1546 produced by American Cyanamid Company, Industrial Products Division, Resin Products Department.

(d) The 70% epoxy resin solution in ethylene glycol monopropyl ether is Epotuf 38-691 produced by Reichhold Chemicals, Inc., Coating Polymers and Resins Division.

(e) The 50% modified acrylic resin solution in xylene is Amberlac 13-802 produced by Reichhold Chemicals, Inc., Coating Polymers and Resins Division.

(f) The 75% isocyanate resin solution in ethyl acetate is a curing agent, Petaflex RC-803 produced by Whittaker Corporation, Dayton Division.

(g) Hexamethoxy methyl melamine is a curing agent, Cymel 303 produced by American Cyanamid Company, Industrial Products Division, Resin Products Department.

(h) p-Toluene sulfonic acid is an acid catalyst available from a number of companies. A 10% solution in butyl alcohol was prepared by mechanically agitating until homogeneous.

(i) Myristic acid is a crystalline organic acid with a crystalline melt temperature of 129° F.(54° C.). As Hystrene 9014 it is produced by Witco Corporation, Humko Chemical Division.

(j) n-Tetracosane is a crystalline hydrocarbon with a crystalline melt temperature of 124° F.(51° C.) and is produced by The Humphrey Chemical Company.

(k) Cetyl alcohol is a crystalline alcohol with a crystalline melt temperature of 122° F.(50° C.) and as CO-1695 is produced by Procter and Gamble, Industrial Chemicals Division.

(l) Palmitic acid is a crystalline organic acid with a crystalline melt temperature of 146° F.(63° C.) and as Hystrene 9016 is produced by Witco Corporation, Humko Chemical Division.

(m) Lauric acid is a crystalline organic acid with a crystalline melt temperature of 111° F.(44° C.) and as Hystrene 9512 is produced by Witco Corporation, Humko Chemical Division.

Thus by careful selection of the crystalline organic chemical a coating which temperature self-regulates in a specific temperature range can be formulated.

Other embodiments are within the following claims.

What is claimed is:

1. A heated mirror assembly, the assembly comprising:
    a reflective mirror element having a first side and a second side,
    the second side having a reflective coating applied thereto to facilitate viewing, from the first side, of an image reflected from the reflective coating,
    the second side also having an electrical heating element coupled intimately therewith, the heating element comprising a temperature self-regulating positive temperature coefficient material,
    the material comprising a polymer matrix containing dispersed electrically conductive particulate material, and a polymer-miscible monomeric crystallizable organic compound having a characteristic crystalline melt temperature below about 150° Fahrenheit, the compound being selected from the group consisting of saturated hydrocarbons, organic acids and alcohols,
    the compound being added to the polymer matrix in an amount sufficient to set the switching temperature of the resulting composition to a temperature range in the vicinity of the selected characteristic crystalline melt temperature such that the heating element temperature self-regulates in the range of the selected characteristic crystalline melt temperature.

2. The mirror assembly of claim 1 wherein the electrical heating element further comprises a laminar insulating sheet coupled to the second side and the positive temperature coefficient material is formed on the insulating sheet.

3. The mirror assembly of claim 1 further comprising two or more spaced apart electrodes attached to the heating element such that when current passes through the electrodes the heating element switches at a temperature near the characteristic crystalline melt temperature of the monomeric crystallizable organic material.

4. The mirror assembly of claim 1 wherein the monomeric crystallizable organic compound has between about 10–40 carbon atoms.

5. The mirror assembly of claim 1 wherein the dispersed electrically conductive particulate material is a carbon black.

6. The mirror assembly of claim 1 further comprising a housing for attachment of the mirror assembly to a motor vehicle.

7. The mirror assembly of claim 1 wherein the polymer matrix comprises a crystalline polymer whose melting temperature is at least 10° Fahrenheit above that of the crystalline monomeric organic compound.

8. The mirror assembly of claim 1 wherein said polymer is a non-crystalline polymer.

* * * * *